Figure 1:
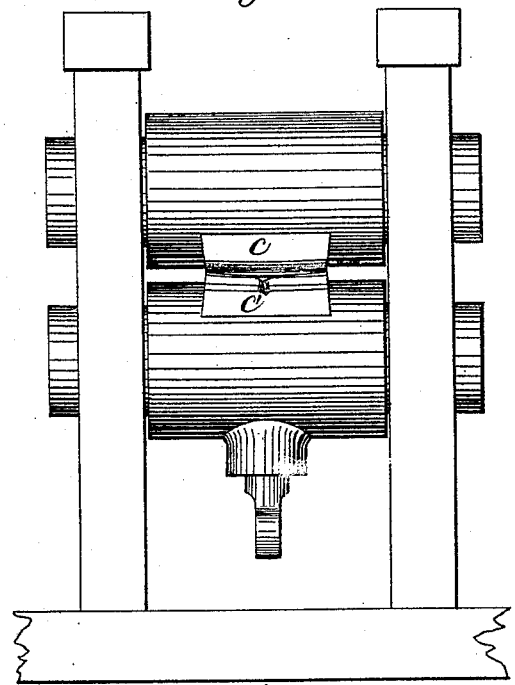

(No Model.) 2 Sheets—Sheet 1.
G. B. ELY.
METHOD OF AND APPARATUS FOR MAKING HOES.

No. 357,766. Patented Feb. 15, 1887.

Witnesses.
Jas. J. Maloney.
H. P. Bates.

Inventor.
George B. Ely.
by Jos. P. Livermore
Att'y.

(No Model.) 2 Sheets—Sheet 2.
G. B. ELY.
METHOD OF AND APPARATUS FOR MAKING HOES.
No. 357,766. Patented Feb. 15, 1887.
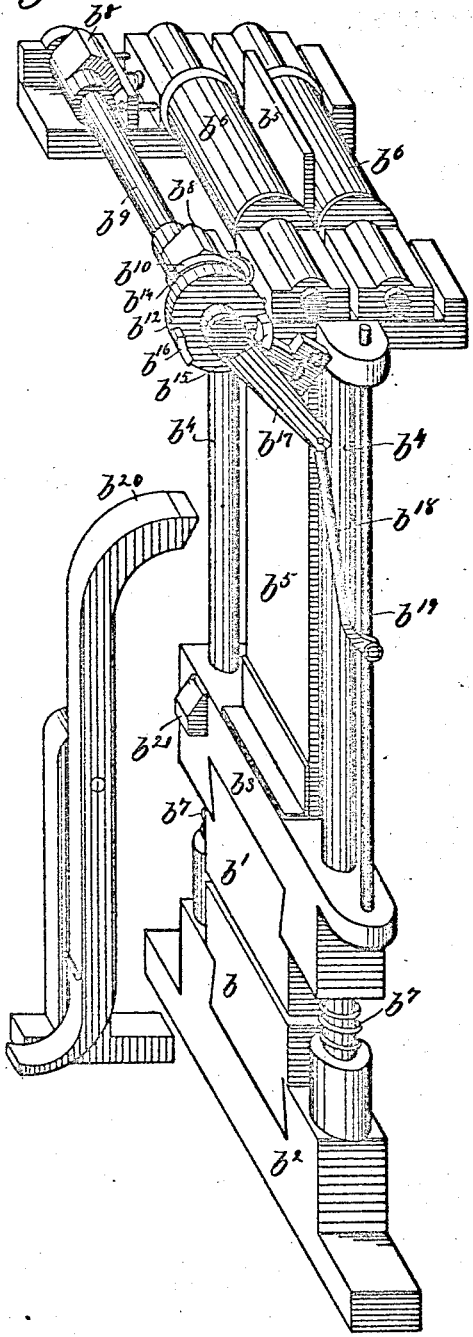
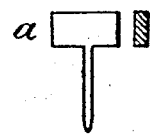
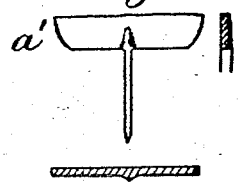
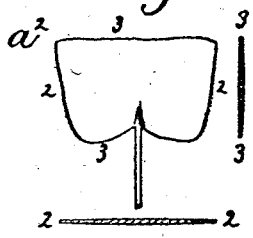
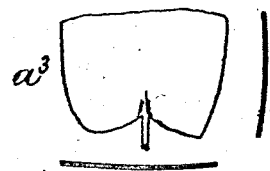
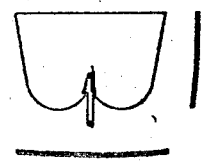
Witnesses.
Jas. J. Maloney.
W. R. Bates.
Inventor
George B. Ely.
by Jos. P. Livermore
Att'y.

United States Patent Office.

GEORGE B. ELY, OF ST. JOHNSBURY, VERMONT.

METHOD OF AND APPARATUS FOR MAKING HOES.

SPECIFICATION forming part of Letters Patent No. 357,766, dated February 15, 1887.

Application filed October 12, 1886. Serial No. 216,000. (No model.)

*To all whom it may concern:*

Be it known that I, GEORGE B. ELY, of St. Johnsbury, county of Caledonia, State of Vermont, have invented an Improvement in Methods and Apparatus for Making Hoes, of which the following description, in connection with the accompanying drawings, is a specification, like letters on the drawings representing like parts.

My invention relates to a process of making hoes and an apparatus for carrying out the said process, the object being to produce a more perfect article at less expense than by the methods heretofore practiced.

In making hoes as heretofore commonly practiced the blank for a hoe is "rolled" or "plated" out, as it is called, making a plate of about double the thickness required for a finished hoe, the said plate being of uniform thickness and flat or plane on both sides and covered with scale. It is then reheated and rolled again to reduce its thickness somewhat; but at the end of the second rolling it is still thicker than the finished hoe, and has a rough and scaly surface, which must be removed in order to give the desired finish to the hoe. As usually practiced, the scale is removed and the rough surface smoothed by grinding after the hoe has been tempered. After the second rolling, that leaves the hoe-blank thicker than the finished hoe, the blank is reheated and acted upon by concave dies that give the blank the required concave shape, but do not materially reduce its thickness, and after the action of these drop-dies the blank is heated and tempered and then ground and polished, the grinding operation removing the scale and reducing the blank to the proper thickness for a finished hoe.

By the present invention several of the steps just described are omitted, and a portion of the apparatus required for performing the said steps is also rendered unnecessary, and a hoe is produced having the same general shape and thickness as that produced by the process just described, but of superior quality.

Briefly stated, the important features of the process embodying the present invention consist in removing the scale from the blank at some point in the process of rolling the blank, preferably just after the first rolling, and in the last rolling bringing the hoe-blank to the required concaved shape and proper thickness for the finished hoe and rolling the temper into the blank, which thus leaves the last rolls properly concaved and of proper thickness, and with the temper desired for the finished hoe, and with a smooth finished surface that requires no grinding, so that all the operations of concaving the blank by drop-dies after the last rolling, and then tempering and grinding the blank, are in the present process omitted, and the previous steps in the process up to the time of the last rolling are somewhat different from those of the method heretofore commonly practiced.

In making hoes in accordance with the present invention, the blank after being rolled or plated out, as by the usual process, already described, is reheated and put into a drop-press, of peculiar construction, having wooden dies that are kept covered with water and which strike a single sharp blow upon the blank, removing all scale and leaving the blank with a smooth clean surface. This action of the wet dies does not greatly reduce the heat of the blank, which is at the same heat immediately subjected to the action of a pair of rolls which are concave and convex, but the concave one of slightly greater curvature than the convex one, so that the blank, when passed between them, will be curved or concave on one side and convex on the other, and of somewhat greater thickness at the middle than at the edges, which are left by this set of rolls of proper thickness for the finished hoe, and owing to the thinness of the edge portion it takes some temper, so that it will spring instead of bending. The blank is then reheated and passed into another pair of rolls, which are also concave and convex, but with the same curvature, so that the blank will be rolled by them to uniform thickness, and these rolls will bear on the middle portion of the blank, owing to the greater thickness of this portion left by the previous roll. The last-mentioned rolling operation consequently expands the middle part of the blank without drawing the edges, and produces a bulge or curvature, which is the proper curvature for the finished hoe in the direction parallel with its cutting-edge. The up-and-down curvature in the direction at right angles to the cutting-edge is produced at the same time by giving the blank an up-and-down rocking movement in the plane at right angles to the axis of the rolls as it passes between the rolls, which rocking movement is shown as produced and gaged by a swinging arm or pendulum that is employed to guide the tongs by which the blank is held when presented to the rolls. At the end of this step the blank is of proper thickness and curvature, and also has received the proper temper in the act of rolling, so that the only other step required to finish the hoe is to trim the blank to the proper outline and polish it, thus dispensing with the steps of concaving in dies and reheating and tempering and then grinding that were required in the process heretofore commonly employed; and as the metal requires less heating and manipulation the quality of the product is better and the cost of manufacture is greatly reduced.

Figure 2:
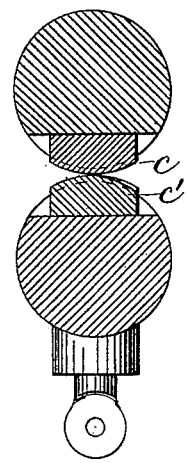
Figure 3:
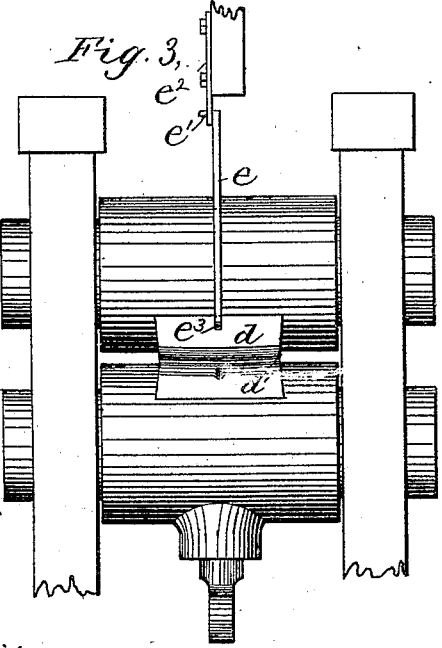
Figure 4:
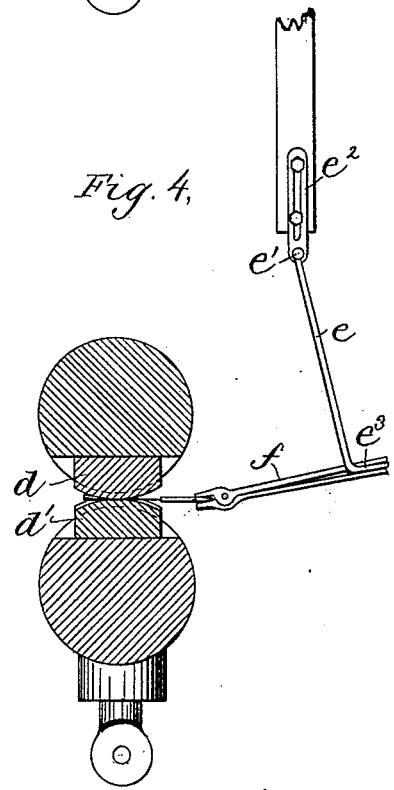

Figures 1 and 2 are a front and side elevation, respectively, of the rolling device employed for the first step of the improved process after the rolling or plating out, by which step the blank is rolled to the thickness required for the finished article at its edges, but left thicker or with surplus stock at the middle. Figs. 3 and 4 are corresponding front and side elevations of the roller-dies for performing the next step, by which the blank is given the proper curvature in both directions and reduced to the proper thickness throughout and tempered; Fig. 5, a perspective view of the drop-dies by which the scale is removed; and Figs. 6 to 10, inclusive, face views and longitudinal and transverse sections of the blank at the different steps in its manufacture.

In the manufacture of hoes in accordance with this invention a piece of steel, such as represented at $a$ in Fig. 6, is first rolled to make a blank, $a'$, such as indicated in Fig. 7, of sufficient width for a hoe, and of about double the thickness required for the finished hoe, this blank being of uniform thickness throughout and substantially flat or plane on both surfaces. This step, commonly called "plating out," is performed by rolls or oscillating dies in the usual manner, and is the same as commonly employed to produce the blank for a hoe by the process of manufacture heretofore practiced. This plated-out blank $a'$ is then reheated and acted upon by a device for removing the scale, (Shown in Fig. 5 as a drop-die, having the dies $b$ $b'$ made of wood, the former inserted in a cast-iron bed or base, $b^2$, and the latter in a cast-iron head, $b^3$, traveling on guides $b^4$, and provided with a shank or lifting piece, $b^5$, that extends between a pair of friction-rollers, $b^6$, that are constantly rotated in the direction to raise the head $b^3$ and die $b'$, but which have their pressure against the lifting-shank $b^5$ relieved when the die is raised and while it is falling, and are automatically brought into engagement with or so as to press against the said shank immediately after the die has fallen and struck its blow.) The head $b^3$ in falling strikes upon springs $b^7$, that are sufficiently stiff to sustain the weight of the head and die, but do not materially check its momentum, so that the die strikes its blow with proper force and is instantly raised from the blank that has been struck, so that the latter can be at once removed from the drop-dies and applied to the roller-dies, that are next to act upon it, while it retains sufficient heat to be properly spread by the said roller-dies.

The mechanism for automatically raising the die $f'$ after it has struck its blow is not essential to this invention; but the construction shown may be briefly described as follows: The bearings of one of the rollers $b^6$ are laterally movable on the frame-work of the machine toward and from the other roller, and are operated by cams $b^8$ on a shaft, $b^9$, having fixed upon it a plate, $b^{10}$, having a portion of its periphery cut away and terminating in radial shoulders, one only of which is shown in the drawings, the other being about opposite to it. A plate, $b^{12}$, loose on the shaft $b^9$, is provided with a weighted arm, $b^{13}$, and with a pin or projection, $b^{14}$, that travels in the cut-away portion of the periphery of the plate or disk $b^{10}$, and by striking on the shoulders of said disk partially rotates the shaft $b^9$, so as to force the cams $b^8$ against the bearings of the rollers $b^6$, as shown, or moving the said cams away from the bearings, so that the roller is no longer pressed against the board $b^5$ with sufficient friction to engage and propel the same. The disk $b^{12}$ is provided with projections $b^{15}$ $b^{16}$ in position to be engaged by an arm, $b^{17}$, also loose on the shaft $b^9$, and connected by a link, $b^{18}$, with a rod, $b^{19}$, connected with the die-carrying head $b^3$. Thus, in the last downward movement or drop of the die-carrying head $b^3$ the arm $b^{17}$ engaged the projection $b^{16}$, which was then at the other side of the center of the shaft $b^9$, while the weight $b^{13}$ also hung at the other side of the said shaft from that in which it is shown, and the said arm $b^{19}$ turned the plate $b^{12}$ until the weight $b^{13}$ passed above the center of the shaft $b^9$, when the said weight dropped by gravity, throwing the projection $b^{14}$ against the shoulder on the plate $b^{10}$, as shown in the drawings, thus causing the cam $b^8$ to force the rolls $b^6$ together, so that they immediately begin to act to raise the die-carrying head $b^3$. In thus raising the said head the arm $b^{17}$ will engage the projection $b^{15}$, as shown, thus raising the weight $b^{13}$, without, however, turning the plate $b^{10}$ and shaft $b^9$ until just as the die-carrying head $b^3$ comes to its highest position, the weight $b^{13}$ passes over the center of the shaft $b^9$ and drops on the other side thereof, causing the pin $b^{14}$ to engage the opposite shoulder on the plate $b^{10}$ and turn the same with the shaft $b^9$, so as to disengage the cams $b^8$ from the bearings of the rollers $b^6$ and relieve the pressure of the said rollers from the lifting-shank $b^5$, thus leaving the die-carrying head $b^3$ in condition to drop by its own weight. The said die-carrying head $b^3$ is, however, retained in its raised position ready to drop by a catch, $b^{20}$, that engages a shoulder, $b^{21}$, on the said head. It is necessary, therefore, for the operator, having the hoe-blank properly heated merely to place it in the die $b$, and trip the catch $b^{20}$ by pressing the lower end of the same with his foot, when the die $b'$ will drop and strike the blank a blow which will, by the action of the water with which the dies $b$ $b'$ are kept constantly wet, remove all the scale from the blank, which is then immediately taken by a pair of roller-dies, $c$ $c'$, (see Figs. 1 and 2,) which are concave and convex in the direction parallel with the axis about which they turn, the concave one being of somewhat greater curvature than the other, as shown, so that the dies are nearer together at their edges than at the middle, and the blank at the end of this operation is, as shown at $a^2$ in Fig. 8, being slightly curved in the section parallel with the edge of the finished hoe, which will for convenience be called the "transverse section," and also in the vertical section at right angles to the said edge, and being thicker at its middle than at its edge in this section. By this operation the blank $a^2$, Fig. 8, is reduced to the thickness desired for the finished hoe at its edges 2 2 3 3, and owing to the hardening or compressing and cooling action of the rolls the blank takes some temper along these edges. The blank is then reheated and acted upon by another set of roller-dies, $d$ $d'$, one of which is concave and the other convex in the direction parallel with the axis of the rolls, and both of substantially the same curvature, so that the space between them is uniform. The blank $a^2$ being thickest at the middle, as already described, will therefore be acted upon mostly at the middle by the rolls or oscillating dies $d$ $d'$, which expand the middle portion without a corresponding stretching or expanding of the edge portions 2 2 3 3, which were somewhat hardened and tempered, as already described. This expansion of the middle, in connection with the harder condition of the edges, will tend to warp or curve the edges 2 2 3 3. The transverse curvature parallel with the edges 3 3 is defined by the shape of the roller-dies, and in order to define the vertical curvature, or that parallel with the edges 2 2, so as to produce the desired vertical curvature of the hoe, a guiding device is provided, consisting of a pendulum-rod, $e$, pivoted at $e'$ above and in front of the rolls on a vertically-adjustable support, $e^2$. The lower end of the pendulum-rod $e$ is offset or provided with a handle, $e^3$, which is grasped by the operator, together with the handles of the tongs $f$, by which the blank is held. The dies $c$ $c'$ and $d$ $d'$ have an oscillating instead of continuous rotary movement, and in the operation the blank is run in between them and then returned in the opposite direction, and the pendulum-rod $e$ causes the tongs $f$ and blank to have an up-and-down movement as the blank enters and leaves the rolls or oscillating dies $d$ $d'$, which movement produces the vertical curvature, so that the blank on issuing from the rolls $c$ $c'$ is of the form shown at $a^3$, Fig. 9, being of substantially uniform thickness and having the desired curvature in both horizontal and vertical directions, as indicated by the sectional views in Fig. 9. Owing to the thinness of the metal, the compressing and cooling in this last rolling operation gives it the temper desired for a finished hoe, so that no separate subsequent tempering operation is required, as is the case when the blanks are left thicker by the rolling operation and subsequently ground to the desired thickness, as heretofore practiced.

The blank $a^2$, Fig. 8, after the first rolling operation, has a smooth clean surface, owing to the removal of the scale previous to this rolling, as before described, and the said blank is so thin as to require but little time for the last heating prior to the action of the rolls $d$ $d'$, so that in this last heating the surface is only slightly oxidized, and no scale sufficient to roughen or indent the surface is formed, and the hoe comes from the rolls $d$ $d'$ properly curved, as shown in Fig. 9, and with a smooth bright surface that is oxidized only enough to give it a black or dark-blue finish, and there is no unevenness that will require grinding.

The other steps necessary for finishing the hoe are the usual ones of trimming the blank to the desired shape in outline, as shown in Fig. 10, by suitable dies, and then polishing, if a bright surface-finish is desired. The blank is provided with the usual shank, $a^6$.

I claim—

1. That improvement in the art or method of making hoes which consists in removing the scale from the plated-out blank, then rolling the said blank thinner at its edges than at its middle, and then by a second rolling reducing the same to a uniform thickness and curved shape, substantially as described.

2. That improvement in the art or method of making hoes which consists in rolling the blank thinner at its edges than at its middle, then by a second rolling process reducing it to a uniform thickness and at the same time giving it curvature in the direction parallel with the edge by the action of the rolls, and giving it curvature in the direction at right angles to the edge by rocking the blank as it enters and leaves the rolls, substantially as described.

3. That improvement in the art or method of making hoes or similar articles which consists in removing the scale from the blank by striking the blank, when heated, with a wet die or drop-hammer and subsequently reducing the blank to its final shape by the action of other dies, substantially as and for the purpose described.

4. That improvement in the art or method of making hoes which consists in shaping the blank by rolls or oscillating dies, and in the final rolling drawing the blank or plate at its middle portion more than at its edges, whereby the concave shape is imparted to the plate, substantially as described.

5. That improvement in the art or method of making hoes which consists in shaping the blank by rolls or oscillating dies, and in the final rolling drawing the blank or plate at its middle portion more than at its edges, whereby the concave shape is imparted to the plate, and tempering the plate in the process of rolling, substantially as described.

6. That improvement in the art or method of making hoes which consists in first spreading the blank, then reheating the same and striking it with wet wooden dies, whereby the scale is removed, and at the same heat further reducing its thickness by pressure in rolls or oscillating dies, and then reheating and drawing or spreading the middle portion more than the edges by pressure in rolls or oscillating dies, whereby a concave blank with a smooth finished surface is produced, substantially as described.

7. The combination, with a pair of rolls or oscillating dies, of a pendulum guide by which the material entering and leaving the rolls is given a definite rocking movement with relation thereto, substantially as described.

In testimony whereof I have signed my name to this specification in the presence of two subscribing witnesses.

GEO. B. ELY.

Witnesses:
J. C. CLARK,
H. ROSS.